(12) United States Patent
Schneider et al.

(10) Patent No.: US 7,562,826 B2
(45) Date of Patent: Jul. 21, 2009

(54) SCAN ENGINE WITH DUAL CHIP ARCHITECTURE FOR USE IN ELECTRO-OPTICAL READERS

(75) Inventors: Gary G. Schneider, Stony Brook, NY (US); James Giebel, Centerport, NY (US); William Sackett, Rocky Point, NY (US); Costanzo Difazio, East Patchogue, NY (US)

(73) Assignee: Symbol Technologies Inc, Holtsville, NY (US)

(*) Notice: Subject to any disclaimer, the term of this patent is extended or adjusted under 35 U.S.C. 154(b) by 257 days.

(21) Appl. No.: 11/254,092

(22) Filed: Oct. 19, 2005

(65) Prior Publication Data

US 2007/0057064 A1 Mar. 15, 2007

Related U.S. Application Data

(60) Provisional application No. 60/716,303, filed on Sep. 12, 2005.

(51) Int. Cl.
*G06K 7/10* (2006.01)

(52) U.S. Cl. .............................. 235/462.33; 235/462.25

(58) Field of Classification Search .................................
235/462.01–464.45, 472.01–472.03, 454,
235/455, 470
See application file for complete search history.

(56) References Cited

U.S. PATENT DOCUMENTS

| 5,581,069 | A | * | 12/1996 | Shepard et al. | 235/462.2 |
|---|---|---|---|---|---|
| 5,668,364 | A | * | 9/1997 | Swartz et al. | 235/472.02 |
| 5,717,221 | A | * | 2/1998 | Li et al. | 250/566 |
| 5,767,501 | A | * | 6/1998 | Schmidt et al. | 235/482.45 |
| 5,850,078 | A | * | 12/1998 | Giordano et al. | 235/462.27 |
| 5,923,021 | A | * | 7/1999 | Dvorkis et al. | 235/455 |
| 6,000,617 | A | * | 12/1999 | Swartz et al. | 235/462.2 |
| 6,145,743 | A | * | 11/2000 | Dvorkis et al. | 235/462.01 |
| 6,283,375 | B1 | * | 9/2001 | Wilz et al. | 235/462.45 |
| 6,347,744 | B1 | * | 2/2002 | Metlitsky | 235/472.02 |
| 6,612,493 | B1 | * | 9/2003 | DeGiovine et al. | 235/462.01 |
| 7,007,849 | B2 | * | 3/2006 | Schmidt et al. | 235/462.22 |
| 7,097,105 | B2 | * | 8/2006 | Wilz et al. | 235/462.45 |

* cited by examiner

*Primary Examiner*—Thien M Le

(57) ABSTRACT

A microprocessor and an application specific integrated circuit are embodied as two chips mounted on a printed circuit board which is, in turn, mounted on a scan engine for use in an electro-optical reader. This dual chip architecture is readily configurable and controls reader operation.

16 Claims, 4 Drawing Sheets

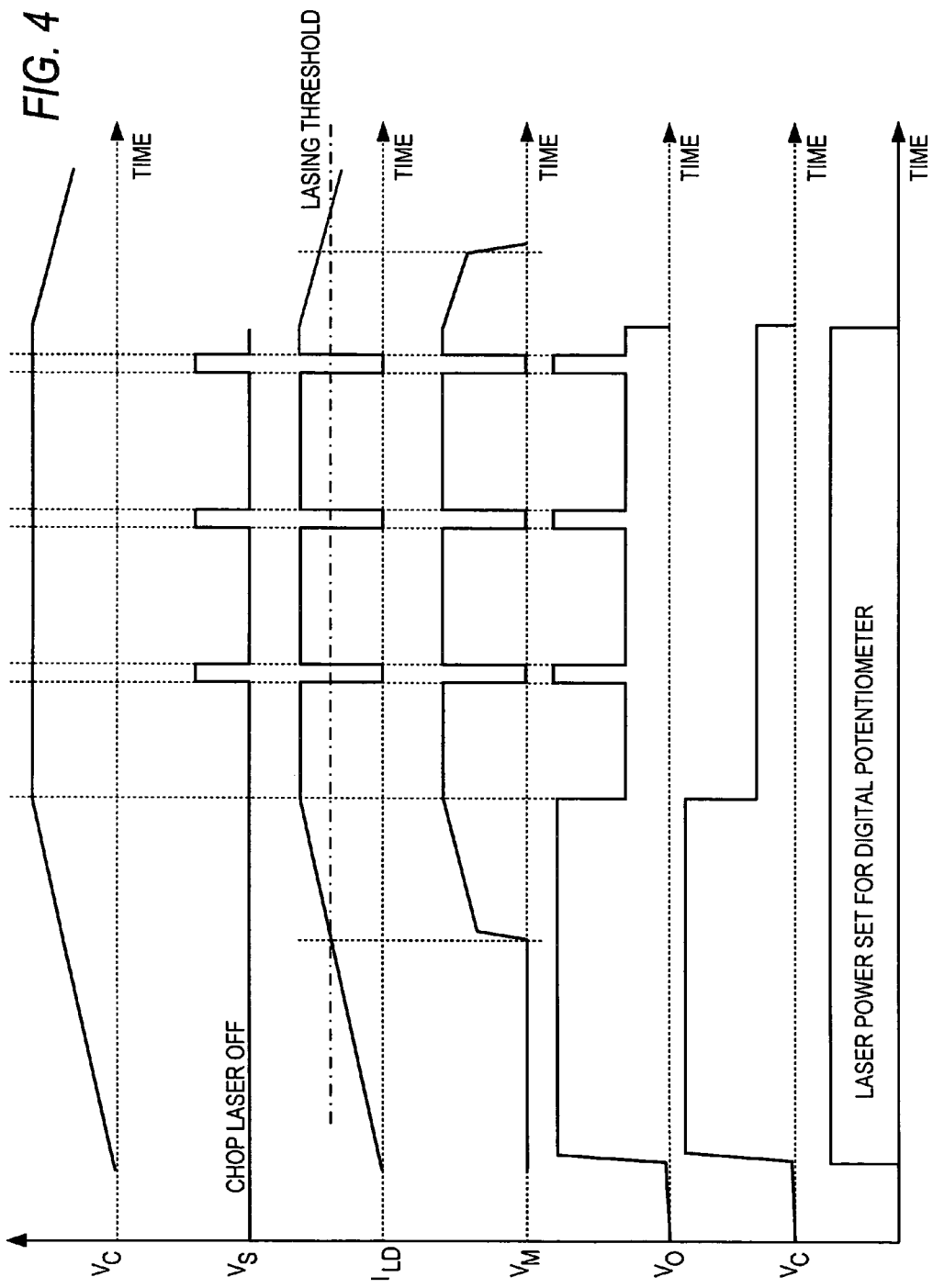

SCAN ENGINE WITH DUAL CHIP ARCHITECTURE FOR USE IN ELECTRO-OPTICAL READERS

CROSS REFERENCE TO RELATED APPLICATION

This application claims the benefit of U.S. Provisional Patent Application Ser. No. 60/716,303, filed Sep. 12, 2005, commonly assigned herewith.

BACKGROUND OF THE INVENTION

1. Field of the Invention

The present invention generally relates to electro-optical readers and, more particularly, to a compact scan engine having a dual chip architecture for use in such readers, the dual chip architecture being readily configurable and operative for controlling reader operation.

2. Description of the Related Art

Various electro-optical readers have been developed heretofore for reading indicia such as bar code symbols appearing on a label or on the surface of an article. The bar code symbol itself is a coded pattern of graphic indicia comprised of a series of bars of various widths spaced apart from one another to bound spaces of various widths, the bars and spaces having different light reflecting characteristics. The readers function by electro-optically transforming the spatial pattern represented by the graphic indicia into a time-varying electrical signal, which is in turn decoded into data which represent the information or characters encoded in the indicia that are related to the article or some characteristic thereof.

Such data is typically represented in digital form and utilized as an input to a data processing system for applications in point-of-sale processing, inventory control, distribution, transportation and logistics, and the like. Readers of this general type have been disclosed, for example, in U.S. Pat. Nos. 4,251,798; 4,369,361; 4,387,297; 4,409,470; 4,760,248; 4,896,026; 5,015,833; 5,262,627; 5,504,316; 5,625,483; and 6,123,265, all of which have been assigned to the same assignee as the instant application and each of which is hereby incorporated by reference herein.

A typical reader includes, inter alia, a hand-held, portable laser scanning device supported by a user. The user aims the device and, more particularly, a light beam, at a targeted symbol to be read. The light source in the reader is typically a semiconductor laser energized by a laser drive circuit. The use of semiconductor devices as the light source is especially desirable because of their small size, low cost and low voltage requirements. The laser beam is optically modified, typically by an optical assembly, to form a beam spot of a certain size at the target distance. It is often preferred that the cross-section of the beam spot measured in the scanning direction at the target distance be approximately the same as the minimum width in the scanning direction between regions of different light reflectivity, i.e., the bars and spaces of the symbol.

In the known readers, a laser light beam is directed by a lens or other optical components along the light path toward a target that includes a bar code symbol on the surface. A moving-beam reader operates by repetitively scanning the light beam in a line or series of lines across the symbol by means of motion of a scan element or scanning component, such as the light source itself or a mirror disposed in the path of the light beam, driven by a motor drive circuit. The scanning component may either sweep the beam spot across the symbol and trace a scan line across the pattern of the symbol, or scan the field of view of the reader, or do both.

The reader also includes a sensor or photodetector which detects light reflected or scattered from the symbol. The photodetector or sensor is positioned in the reader in an optical path so that it has a field of view which ensures the capture of a portion of the light which is reflected or scattered off the symbol, detected, and converted into an electrical signal.

In retroreflective light collection, a single optical component, e.g., a reciprocally oscillatory mirror, such as described in U.S. Pat. No. 4,816,661 or U.S. Pat. No. 4,409,470, both herein incorporated by reference, scans the beam across a target surface and directs the collected light to a detector. In non-retroreflective light collection, the reflected laser light is not collected by the same optical component used for scanning. Instead, the detector is independent of the scanning beam, and is typically constructed to have a large field of view so that the reflected laser light traces across the field of view of the detector.

Electronic receiver circuitry receives the electrical signal and a digitizer processes the signal into a digital representation of the data represented by the symbol that has been scanned. For example, the analog electrical signal generated by the photodetector may be converted by the digitizer into a pulse width modulated digitized signal, with the widths corresponding to the physical widths of the bars and spaces. Alternatively, the analog electrical signal may be processed directly by a software decoder. See, for example, U.S. Pat. No. 5,504,318.

The decoding process usually works in the following way. The analog signal from the sensor or photodetector is amplified, filtered and processed by a receiver circuit which includes an automatic gain control circuit. The pulse width modulated digitized signal is applied to a software algorithm, which attempts to decode the signal, in a microprocessor. If the start and stop characters and the characters between them in the scan were decoded successfully and completely, the decoding process terminates and an indicator of a successful read (such as a green light and/or audible beep) is provided to the user. Otherwise, the decoder implemented as software in the microprocessor receives the next scan, and performs another decode according to a symbology specification into a binary representation of the data encoded in the symbol, and to the alphanumeric characters so represented.

The binary data is communicated to a host computer by an interface cable or wireless communication link. The interface cable may be a "smart cable" such as that described in U.S. Pat. No. 5,664,229 and U.S. Pat. No. 5,675,139, the contents of which are hereby incorporated by reference herein.

The bar code symbols are formed from bars or elements typically rectangular in shape with a variety of possible widths. The specific arrangement of elements defines the character represented according to a set of rules and definitions specified by the code or "symbology" used. The relative size of the bars and spaces is determined by the type of coding used as is the actual size of the bars and spaces. The number of characters (represented by the bar code symbol) per unit length is referred to as the density of the symbol. To encode the desired sequence of the characters, a collection of element arrangements are concatenated together to form the complete bar code symbol, with each character of the message being represented by its own corresponding group of elements. In some symbologies, a unique "start" and "stop" character is used to indicate when the bar code begins and ends. A number of different bar code symbologies is in widespread use including UPC/EAN, Code 39, Code 128, Codeabar, and Interleaved 2 of 5.

In order to increase the amount of data that can be represented or stored on a given amount of surface area, several more compact bar code symbologies have been developed. One of these code standards, Code 49, exemplifies a "two-dimensional" symbol by reducing the vertical height of a one-dimensional symbol, and then stacking distinct rows of such one-dimensional symbols, so that information is encoded both vertically as well as horizontally. That is, in Code 49, there are several rows of bar and space patterns, instead of only one row as in a "one-dimensional" symbol. The structure of Code 49 is described in U.S. Pat. No. 4,794, 239. Another two-dimensional symbology, known as "PDF417", is described in U.S. Pat. No. 5,304,786.

For safety reasons, there are regulations concerning the maximum level of laser beam output power that can be emitted from an electro-optical reader, and this maximum level depends on whether or not the reader is operative to shut off the laser upon detection of a failure of the drive that oscillates the scan element. For example, a Class II laser safety device is limited to a maximum laser output power of 1 mw if there is no laser shut-off feature. If there is a laser shut-off feature, then the device is permitted to output a higher power in the emitted stationary laser beam. A higher laser beam output power is desirable for an increased working range, ambient light immunity, greater scan line visibility and, in general, better overall reader performance.

It is known in the art to use a hardware safety circuit to detect drive failure. The drive includes a motor and a feedback winding that generates a feedback signal having a voltage or amplitude. The hardware safety circuit monitors the amplitude of the feedback signal and turns the laser off if the amplitude falls below a predetermined threshold, thereby indicating that the drive is malfunctioning.

Although generally satisfactory for their intended purposes, the above-described laser drive circuit, motor drive circuit, receiver circuit, digitizer circuit and safety circuit are realized by discrete electrical components that occupy non-negligible space in, and add extra weight to, the reader. These circuits are implemented on one or more printed circuit boards which, together with the other above-described electrical and optical components of the reader, constitute an assembly or module, typically referred to as a "scan engine". It is desirable for the scan engine to be used interchangeably in a variety of different operating modalities and readers of different form factors. Yet, it is difficult to configure the discrete electrical components, which typically are configured manually, especially in the field. The known scan engines are simply too bulky and heavy for those applications where an ultra small form factor is required. Also, the mounting of discrete electrical components increases the assembly cost.

SUMMARY OF THE INVENTION

Objects of the Invention

It is a general object of the present invention to provide an improved chip architecture for a small, lightweight scan engine for use in electro-optical readers.

It is another object of the invention to provide a highly configurable, high performance, ultra small form factor, and inexpensive to assemble, scan engine.

Features of the Invention

In keeping with these objects and others which will become apparent hereinafter, one feature of this invention resides, briefly stated, in a dual chip architecture for controlling electro-optical reading of indicia, such as bar code symbols. The architecture includes an application specific integrated circuit (ASIC) as a first chip and a microprocessor as a second chip, both chips being commonly mounted on a printed circuit board and both chips being together responsible for controlling the reading of the indicia.

On the ASIC are integrated a laser drive for energizing a laser to emit a laser beam toward the indicia, a scanner drive for sweeping the laser beam across the indicia for reflection therefrom, a receiver for receiving an analog received signal indicative of the laser beam reflected from the indicia, and a digitizer for digitizing the received signal to generate a digitized signal. In the microprocessor a decoder is provided for decoding the digitized signal into data corresponding to the indicia.

In a preferred embodiment, at least one of the laser drive, the scanner drive, the receiver and the digitizer has an adjustable element, for example, a digital potentiometer, and the microprocessor is operative for generating a control signal for adjusting the adjustable element and, in turn, for modifying the reading. Any of the integrated circuits on the ASIC generates a feedback signal which is processed by the microcontroller to generate the control signal.

A temperature sensor is also preferably integrated on the ASIC and is operative for sending a measured temperature to the microprocessor which, in turn, is operative to modify the adjustable element in response to temperature variations.

The ASIC and the microprocessor, together with a laser, a scanner, and a detector, as well as optics as necessary, form a self-configuring, compact scan engine or module which is easily fitted inside instruments of small form factor to provide electro-optical reading functionality.

The novel features which are considered as characteristic of the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIG. 4 is a set of waveforms to explain the operation of the circuit diagram of FIG. 3.

DETAILED DESCRIPTION OF THE PREFERRED EMBODIMENTS

As used in this specification, the term "indicia" broadly encompasses not only symbol patterns composed of alternating bars and spaces of various widths commonly referred to as bar code symbols, but also one or two dimensional graphic patterns, such as signatures as well as alphanumeric characters. In general, the term "indicia" may apply to any type of pattern or information which may be recognized or identified by scanning a light beam and/or a field of view of a photodetector, and detecting reflected or scattered light as a representation of variations in light reflectivity at various points of the pattern or information. A bar code symbol is one example of an "indicia" which the present invention can scan.

Figure 1:
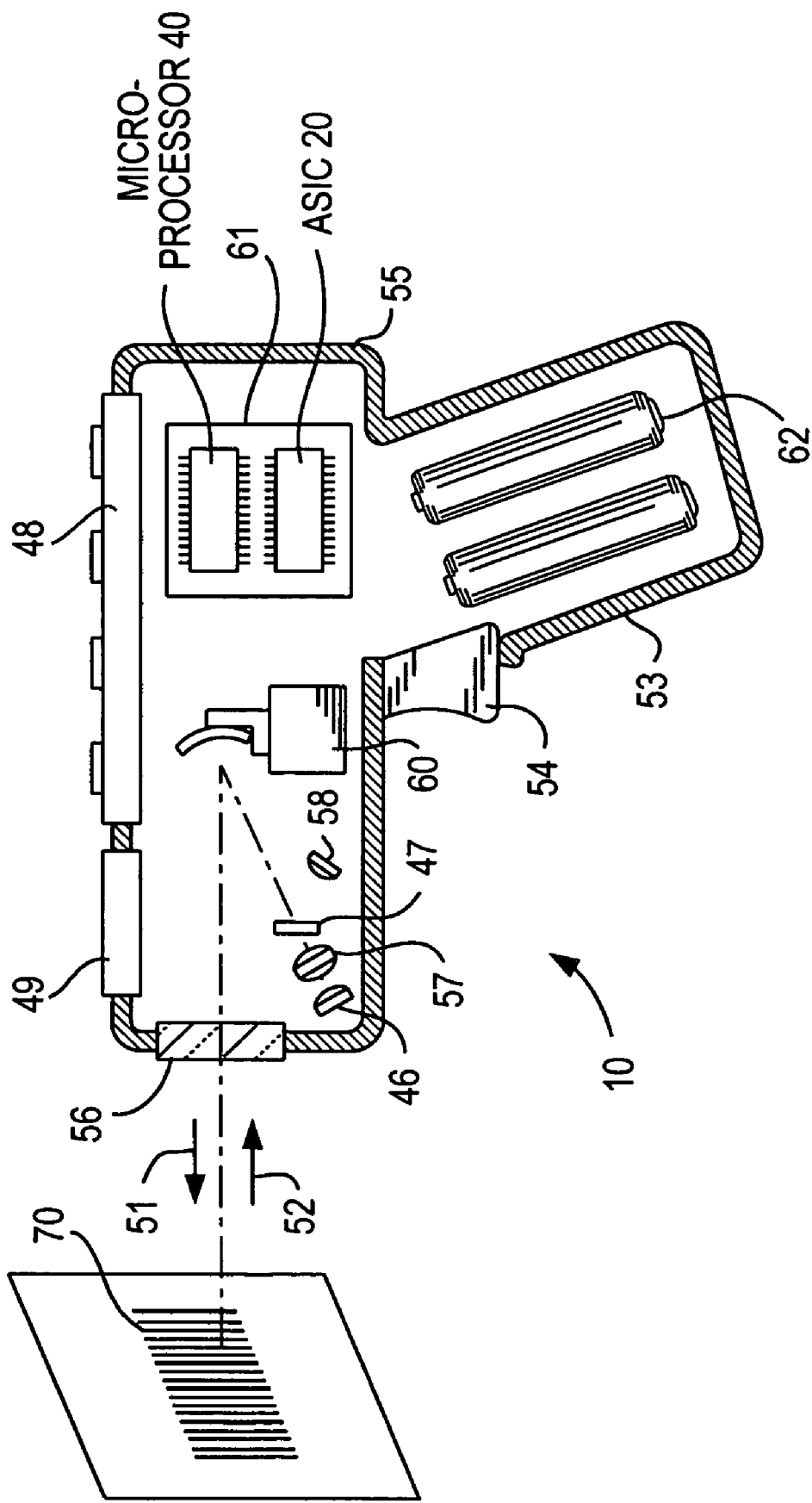
FIG. 1 is a diagrammatic view of an electro-optical reader according to this invention.

FIG. 1 illustrates an example of a bar code symbol reader 10 implemented as a gun shaped device, having a pistol-grip type of handle 53. A lightweight plastic housing 55 contains a light source 46, a detector 58, optics 57, an application specific integrated circuit (ASIC) 20, a programmed microprocessor 40, and a power source or battery 62. A light-transmissive window 56 at the front end of the housing 55 allows an outgoing light beam 51 to exit and an incoming reflected light 52 to enter. A user aims the reader 10 at a bar code symbol 70 from a position in which the reader 10 is spaced from the symbol, i.e., not touching the symbol or moving across the symbol.

As further depicted in FIG. 1, the optics may include a suitable lens 57 (or multiple lens system) to focus the scanned beam into a scanning spot at an appropriate reference plane. The light source 46, such as a semiconductor laser diode, introduces a light beam into an optical axis of the lens 57, and the beam passes through a partially-silvered mirror 47 and other lenses or beam shaping structures as needed. The beam is reflected from an oscillating mirror 59 which is coupled to a scanning drive motor 60 energized when a trigger 54 is manually pulled. The oscillation of the mirror 59 causes the outgoing beam 51 to scan back and forth in a desired pattern.

A variety of mirror and motor configurations can be used to move the beam in a desired scanning pattern. For example, U.S. Pat. No. 4,251,798 discloses a rotating polygon having a planar mirror at each side, each mirror tracing a scan line across the symbol. U.S. Pat. No. 4,387,297 and U.S. Pat. No. 4,409,470 both employ a planar mirror which is repetitively and reciprocally driven in alternate circumferential directions about a drive shaft on which the mirror is mounted. U.S. Pat. No. 4,816,660 discloses a multi-mirror construction composed of a generally concave mirror portion and a generally planar mirror portion. U.S. Pat. No. 6,929,184 discloses a liquid injection molded (LIM) motor.

The light 52 reflected back by the symbol 70 passes back through the window 56 for transmission to the detector 58. In the exemplary reader 10 shown in FIG. 1, the reflected light reflects off of mirror 59 and partially-silvered mirror 47 and impinges on the light sensitive detector 58. The detector 58 produces an analog signal proportional to the intensity of the reflected light 52.

The ASIC 20, as described below, includes a digitizer. The ASIC 20 and the microprocessor 40 are mounted on a printed circuit board 61. The digitizer processes the analog signal from detector 58 to produce a pulse signal where the widths and spacings between the pulses correspond to the widths of the bars and the spacings between the bars. The digitizer serves as an edge detector or wave shaper circuit, and a threshold value set by the digitizer determines what points of the analog signal represent bar edges. The pulse signal from the digitizer is applied to a decoder, typically incorporated as software in the programmed microprocessor 40 which will also have associated program memory and random access data memory. The microprocessor decoder 40 first determines the pulse widths and spacings of the signal from the digitizer. The decoder then analyzes the widths and spacings to find and decode a legitimate bar code message. This includes analysis to recognize legitimate characters and sequences, as defined by the appropriate code standard. This may also include an initial recognition of the particular standard to which the scanned symbol conforms. This recognition of the standard is typically referred to as autodiscrimination.

To scan the symbol 70, the user aims the bar code reader 10 and operates movable trigger switch 54 to activate the light source 46, the scanning motor 60 and the electrical circuitry. If the scanning light beam 51 is visible, the operator can see a scan pattern on the surface on which the symbol appears and adjust aiming of the reader 10 accordingly. If the light beam 51 produced by the source 46 is marginally visible, an aiming light may be included. The aiming light, if needed, produces a visible light spot which may be fixed, or scanned just like the laser beam 51. The user employs this visible light to aim the reader at the symbol before pulling the trigger.

The reader 10 may also function as a portable data collection terminal. If so, the reader 10 would include a keyboard 48 and a display 49, such as described in the previously noted U.S. Pat. No. 4,409,470.

In accordance with this invention, the ASIC 20 and the microprocessor 40 represent a unique dual chip architecture mounted on the same board 61. Together, these two chips 20, 40 share the control function of a reading session. As described below, the software of the microprocessor is readily modified and updated and, in turn, the microprocessor can modify and update the operation of the ASIC and the analog behavior of the reader. The board 61, together with the laser 46, optics 57, detector 58, and motor 60, are supported on a common support which comprises the above-described compact scan engine.

Figure 2:
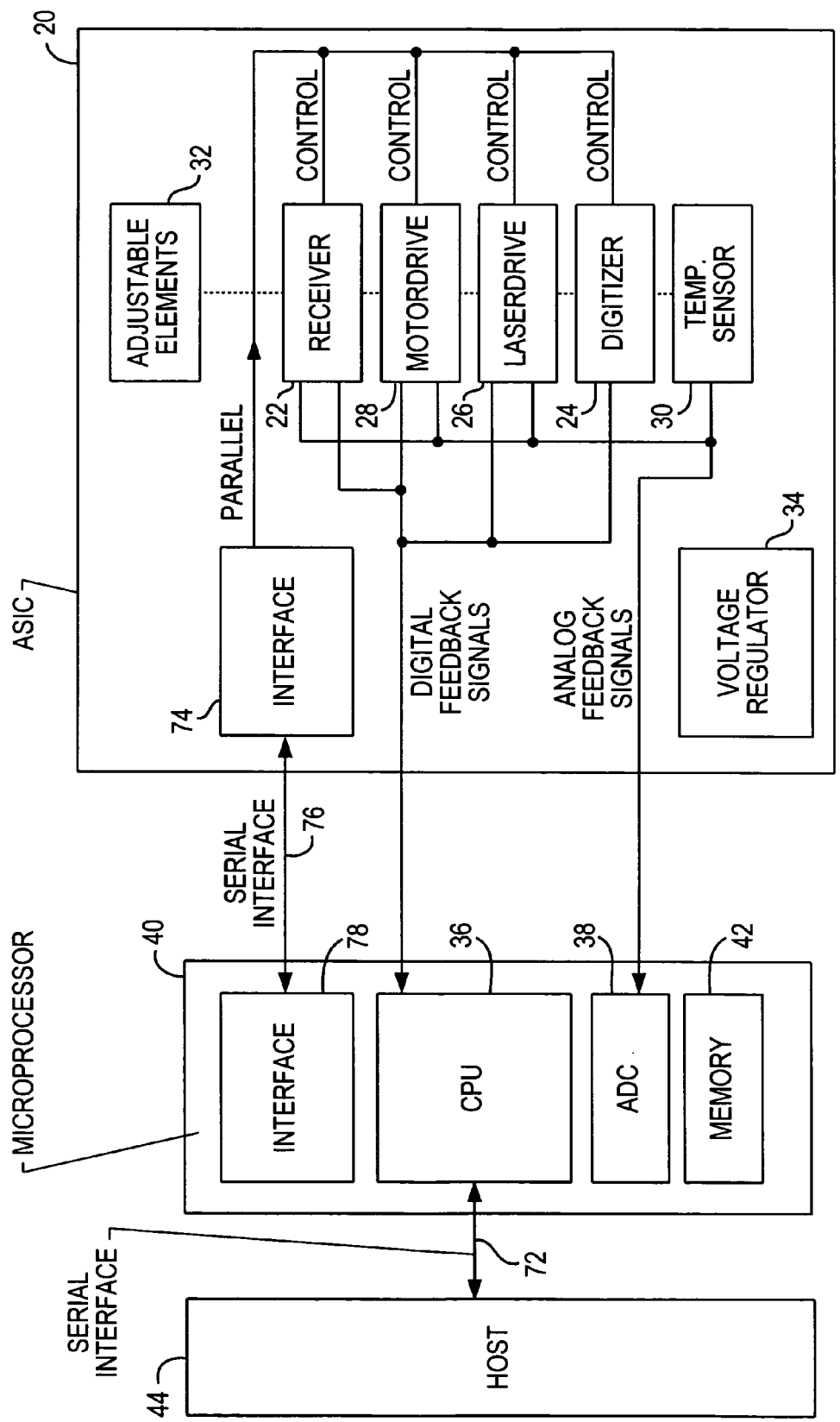
FIG. 2 is a block diagram of a dual chip architecture for a scan engine for use in the reader of FIG. 1.

FIG. 2 depicts in more detail the functional blocks on the ASIC 20 and the microprocessor 40. Thus, the ASIC includes a receiver 22 which, as noted above, includes one or more fixed amplifier stages to increase the gain of the received signal, at least one active filter stage to filter noise from the received signal, and an automatic gain controller (AGC) to control the gain. The ASIC also includes a digitizer 24 which digitizes the analog signal by processing the signal with differentiating circuits, peak detectors, multiplexers, logic elements, and comparators. The ASIC also includes a laser drive circuit 26 for energizing the laser, preferably with an electronic beam clipping circuit for chopping the laser drive current, as well as safety circuits for detecting when the laser output is not within prescribed limits, as described in FIGS. 3-4 below. The ASIC also includes a motor drive circuit 28 for actuating the oscillating mirror 59 by using positive feedback through a mechanical filter and discrete time signal processing, as well as safety circuits for deactuating the motor drive circuit in the event of laser or motor malfunction. A temperature sensor circuit 30 is integrated in the ASIC to monitor the chip temperature thereof, as well as the ambient temperature. These circuits, together with a voltage regulator circuit 34, are integrated in the ASIC.

Each of the receiver, motor drive, laser drive, and the digitizer has an element 32 which can be adjusted under control of the microprocessor 40, as described below. The adjustable element 32 includes one or more of a digital potentiometer, a programmable control register, or switches.

The microprocessor 40 includes a central processing unit (CPU) 36, an analog-to-digital converter (ADC) 38, and a memory 42. The microprocessor 40 communicates with an external host 44 over a serial interface 72. The microprocessor 40 has an interface 78 that communicates with an interface 74 on the ASIC via another serial interface 76.

During manufacture, the microprocessor can interact with the host 44 over serial interface 72 to calibrate reader parameters such as laser output power, scan amplitude of the mirror 59, duty cycle of the motor, etc. These parameters can be stored in memory 42 so that they can be recalled during normal operation.

During reader operation, the microprocessor can interact with the ASIC 20 over serial interface 76 to direct respective control signals to an adjustable element 32 in one or more of the receiver, motor drive, laser drive, and digitizer, circuits. The circuits 22, 24, 26, 28 conduct digital feedback signals back to the CPU 36. These circuits 22, 24, 26, 28, as well as the temperature sensor circuit 30, conduct analog feedback signals back to the ADC 38 for conversion to digital feedback signals. The temperature measured by the sensor circuit 30 can be used with any of the individual circuits 22, 24, 26, 28 in the ASIC to adapt their functions to temperature variations.

Thus, the laser drive current and the laser output power can be monitored by the microprocessor, and the reader can be shut down in the event of a laser malfunction. The microprocessor can control the motor drive 28 to have a specific scan angle, thereby supporting multiple scan angles in a single scan engine configuration. The microprocessor can analyze the received signal and change various programmable parameters, such as receiver bandwidth, digitizer thresholds, laser output power, motor amplitude, margin thresholds, digitizer hysteresis, etc. The microprocessor can turn off the laser at the ends of each scan line (when the velocity of the laser beam spot is nearly zero), thereby enabling the scan engine to operate at a higher laser output power for increased performance.

As previously mentioned, the motor oscillates the mirror 59, typically at a resonant frequency. A permanent magnet is jointly mounted with the mirror 59. A feedback winding is situated in proximity to the magnet and generates a feedback signal whose amplitude increases to a maximum as the mirror is moved in one direction toward the middle of a scan line, and then decreases to zero when the motor briefly stops at one end of the scan line, and then decreases to a minimum as the mirror is moved in the opposite direction toward the middle of the next scan line, and then increases to zero when the motor briefly stops at the other end of the next scan line. This feedback signal has the same frequency as the resonant frequency of the drive signal used to drive the motor. A zero crossing detector is employed to generate a start-of-scan (SOS) signal. By monitoring the SOS signal, the microprocessor can change and update the adjustable element 32 in the motor drive circuit 28, thereby compensating for undesirable drive frequency variations.

The temperature is continuously detected by the temperature sensor circuit 30 and fed to the microprocessor for evaluation. For example, as the temperature increases, there is a tendency for the scan angle of the mirror 59 to be decreased. Then, the microprocessor can change the adjustable element 32 in the motor drive circuit 28 to increase the scan angle, thereby achieving scanning that is adaptive to temperature variations.

The microprocessor also collects reader data and reports to the host 44. The host can use these reports to remotely manage the reader. For example, such reports include the internal chip temperature measured by the temperature sensor circuit 30, the laser output power and laser drive current detected by the laser drive circuit 26, and the drive frequency and scan angle detected by the motor drive circuit 28. Even the serial number, part number, manufacture date and software revision version can be reported to the host. The host, in turn, can initiate in-reader firmware updates to update the reader.

Hence, no longer need such system parameters as motor scan angle and laser output power be adjusted by manually turning trimpots before the reader housing is closed. The single board design simplifies and reduces the cost of manufacture and, of course, enables the scan engine to have an ultra small form factor.

The architecture described herein supports an adaptable system where the microprocessor receives digital and analog feedback signals from the ASIC, and changes and continuously adapts the analog behavior of the reader to best match the characteristics of the symbol being read. The software or algorithms in the microprocessor that control adaptation of the reader are easily accessed and modified by the host 44 over the serial interface 72.

Figure 3:
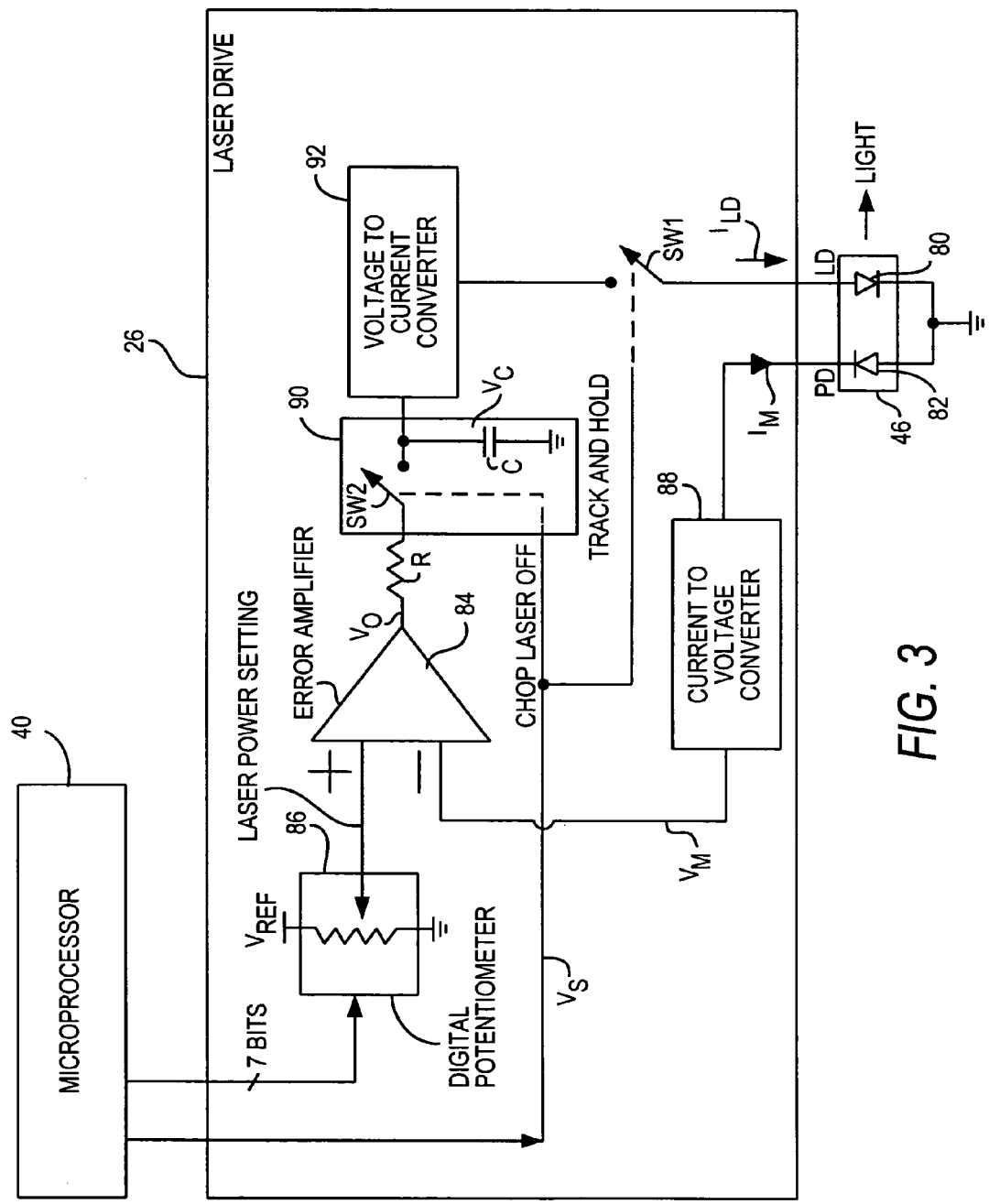
FIG. 3 is a circuit diagram of a detail of the architecture.

Turning now to FIG. 3 and its explanatory waveforms depicted in FIG. 4, the laser drive circuit 26 includes a laser power regulator, which is a closed loop feedback system that maintains a constant optical output power by varying the applied forward current $I_{LD}$ to the laser diode. The laser diode assembly 46 is a three terminal device that includes a laser diode 80 (LD) and a monitor photodiode 82 (PD). A small fraction of the output laser light is coupled into the monitor photodiode 82 within the enclosed assembly 46. This induces a photocurrent $I_m$ in the monitor photodiode that is proportional to the laser output power. This photocurrent $I_m$ is the negative feedback signal that is used to regulate the laser's output power.

An error amplifier 84 compares an input control voltage from a digital potentiometer 86 to a voltage signal (Vm) that is generated by a current to voltage converter 88 and that is proportional to the monitor feedback current. This negative feedback arrangement and the resulting error voltage $V_o$ at the output of this amplifier 84 will change the laser current $I_{LD}$ as needed to drive the error voltage to a minimum, and this action holds the laser's output power constant as the temperature of the laser assembly 46 changes, and as the laser 80 ages.

An RC network, that creates the dominant pole in the system, provides loop compensation for the regulator. This RC network has a large time constant of several milliseconds, and because this loop needs to be slow, the switches SW2 and SW1 are included to provide the means to quickly turn the laser 80 on and off. For example, in an electronic beam clipping mode, SW1 and SW2 are used to produce fast rise and fall times in the laser's output that are less than 100 microseconds.

A "Chop Laser Off" signal $V_c$ from the microprocessor 40 is used to operate SW1 and SW2, and when this signal goes high, SW1 and SW2 are opened in unison. As shown in FIG. 3, SW1 is used to abruptly remove and apply current to the laser 80, and SW2, as part of a track and hold circuit 90, is used to hold the control voltage $V_c$ that was present moments before current was removed from the laser 80. This track and hold circuit 90 is used to remember the laser's operating point so that it can be quickly reestablished when SW1 is closed. The track and hold circuit 90 also isolates the control voltage ($V_c$) for the error amplifier 84 as this amplifier reacts violently to changes in the laser's output that are not commanded by the laser power setting control of the digital potentiometer 86. A voltage to current converter 92 is connected between the track and hold circuit 90 and switch SW1.

In the beam clipping mode, the circuit of FIG. 3 effectively eliminates the end regions of each scan line, especially the end dwell point where the motor pauses briefly and reverses direction. At each dwell point, the laser beam spot has a higher intensity than in the middle of each scan line. By eliminating these regions of high laser output intensity, the average laser power can be increased, thereby increasing laser performance, but without exceeding average laser power industry guidelines and safety regulations.

The temperature sensor circuit 30, as previously described, advises the microprocessor 40 of the ambient temperature and, in turn, the microprocessor sets the digital potentiometer 86 to compensate for such temperature variations, especially those caused as the laser diode 80 ages.

It will be understood that each of the elements described above, or two or more together, also may find a useful application in other types of readers differing from the types described above.

While the invention has been illustrated and described as embodied in a dual chip architecture for a scan engine for use in an electro-optical reader, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims.

We claim:

1. A dual chip architecture for controlling electro-optical reading of indicia, comprising:
   a) an application specific integrated circuit (ASIC) constituting a first chip on which are integrated a laser drive for energizing a laser to emit a laser beam toward the indicia, a scanner drive for sweeping the laser beam across the indicia for reflection therefrom, a receiver for receiving an analog received signal indicative of the laser beam reflected from the indicia, and a digitizer for digitizing the received signal to generate a digitized signal, at least one of the laser drive, the scanner drive, the receiver and the digitizer having an adjustable element;
   b) a microprocessor constituting a second chip operatively connected to the first chip and operative for generating a control signal for adjusting the adjustable element during reading, the microprocessor including a decoder for decoding the digitized signal into data corresponding to the indicia; and
   c) a single printed circuit board on which the first and second chips are commonly mounted.

2. The architecture of claim 1, wherein the adjustable element is a digital potentiometer having settings controlled by the microprocessor.

3. The architecture of claim 1, wherein the at least one of the laser drive, the scanner drive, the receiver and the digitizer generates a feedback signal during reading of the indicia, and wherein the microprocessor receives and processes the feedback signal to generate the control signal.

4. The architecture of claim 1, wherein the chips are operatively connected over a serial interface, and wherein the microprocessor is operatively connected to a host over another serial interface.

5. The architecture of claim 1, and a temperature sensor integrated on the ASIC for measuring temperature and for sending a measured temperature to the microprocessor.

6. The architecture of claim 1, wherein the microprocessor has a memory in which reading parameters are stored and recalled during reading of the indicia.

7. A scan engine in a reader for electro-optically reading indicia, comprising:
   a) an energizable laser for emitting a laser beam toward the indicia;
   b) an actuatable scanner for sweeping the laser beam across the indicia for reflection therefrom;
   c) a detector for detecting light reflected from the indicia to generate an analog received signal;
   d) an application specific integrated circuit (ASIC) constituting a first chip on which are integrated a laser drive for energizing the laser, a scanner drive for actuating the scanner, a receiver for receiving the received signal, and a digitizer for digitizing the received signal to generate a digitized signal, at least one of the laser drive, the scanner drive, the receiver and the digitizer having an adjustable element;
   e) a microprocessor constituting a second chip operatively connected to the first chip and operative for generating a control signal for adjusting the adjustable element during reading, the microprocessor including a decoder for decoding the digitized signal into data corresponding to the indicia; and
   f) a single printed circuit board on which the first and second chips are commonly mounted.

8. The scan engine of claim 7, wherein the adjustable element is a digital potentiometer having settings controlled by the microprocessor.

9. The scan engine of claim 7, wherein the at least one of the laser drive, the scanner drive, the receiver and the digitizer generates a feedback signal during reading of the indicia, and wherein the microprocessor receives and processes the feedback signal to generate the control signal.

10. The scan engine of claim 7, wherein the chips are operatively connected over a serial interface, and wherein the microprocessor is operatively connected to a host over another serial interface.

11. The scan engine of claim 7, and a temperature sensor integrated on the ASIC for measuring temperature and for sending a measured temperature to the microprocessor.

12. The scan engine of claim 7, wherein the microprocessor has a memory in which reading parameters are stored and recalled during reading of the indicia.

13. A method of controlling electro-optical reading of indicia, comprising the steps of:
   a) integrating, on an application specific integrated circuit (ASIC), a laser drive for energizing a laser to emit a laser beam toward the indicia, a scanner drive for sweeping the laser beam across the indicia for reflection therefrom, a receiver for receiving an analog received signal indicative of the laser beam reflected from the indicia, and a digitizer for digitizing the received signal to generate a digitized signal, and integrating at least one adjustable element on the ASIC;
   b) decoding the digitized signal into data corresponding to the indicia by a microprocessor operatively connected to the ASIC, and adjusting operation of the ASIC by the microprocessor by generating a control signal by the microprocessor to adjust the at least one adjustable element during reading; and
   c) commonly mounting the ASIC constituting a first chip and the microprocessor constituting a second chip on a single printed circuit board.

14. The method of claim 13, and the step of measuring temperature by integrating a temperature sensor on the ASIC.

15. An arrangement for controlling output power of a laser having a laser diode for emitting a laser beam during electro-optical reading of indicia and a monitor photodiode for generating a negative feedback signal proportional to the output power of the laser beam, the arrangement comprising:
   a) an application specific integrated circuit (ASIC) on which a laser drive is integrated, the laser drive including a feedback circuit for regulating the output power of the laser beam as a function of the negative feedback signal, and an adjustable element having power settings; and
   b) a microprocessor operatively connected to the ASIC for generating a control signal for setting the adjustable element to one of the power settings during reading.

16. The arrangement of claim 15, wherein the adjustable element is a digital potentiometer.

* * * * *